United States Patent
Kim et al.

(10) Patent No.: US 7,561,368 B2
(45) Date of Patent: Jul. 14, 2009

(54) HARD DISK DRIVE HAVING IMPROVED HEAD STABILITY AT LOW TEMPERATURE AND METHOD OF APPLYING CURRENT TO A HEAD OF THE HARD DISK DRIVE

(75) Inventors: Sung-chul Kim, Suwon-si (KR); Jong-yoon Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/923,016

(22) Filed: Oct. 24, 2007

(65) Prior Publication Data

US 2008/0247080 A1    Oct. 9, 2008

(30) Foreign Application Priority Data

Apr. 3, 2007    (KR) ............... 10-2007-0032938

(51) Int. Cl.
G11B 21/02    (2006.01)
(52) U.S. Cl. ........................................ 360/75
(58) Field of Classification Search .............. None
See application file for complete search history.

(56) References Cited

U.S. PATENT DOCUMENTS

2002/0191326 A1    12/2002    Xu et al.
2005/0254171 A1*    11/2005    Ota et al. .................. 360/128
2007/0064322 A1    3/2007    Migitaka et al.
2007/0091512 A1*    4/2007    Nichols et al. ........... 360/324.2
2007/0127161 A1*    6/2007    Sano et al. ................ 360/313
2007/0236821 A1*    10/2007    Ma et al. .................... 360/75

FOREIGN PATENT DOCUMENTS

| JP | 07-85409 | 3/1995 |
|---|---|---|
| JP | 2004-79126 | 3/2004 |
| JP | 2004-110918 | 4/2004 |
| KR | 2006-75126 | 7/2006 |

* cited by examiner

Primary Examiner—Andrew L Sniezek
(74) Attorney, Agent, or Firm—Stanzione & Kim LLP

(57) ABSTRACT

A hard disc drive (HDD) that has improved head stability at low temperatures and a method of supplying current to a head of the HDD. The HDD includes a disc, a tunneling magneto resistance (TuMR) head to read data recorded on the disc having a heating coil, and a current control unit to supply a current corresponding to the ambient temperature surrounding the HDD to the heating coil. The current control unit supplies a current corresponding to the ambient temperature to the heating coil of the head. Since a heating coil is inserted in the TuMR head, an optimum current corresponding to the ambient temperature can be supplied to the heating coil, and thus, the head instability during a reading operation at low temperatures can be prevented.

20 Claims, 6 Drawing Sheets

| HDD | 0 ~ 10 [°C] | 10 ~ 20 [°C] | 20 ~ 30 [°C] | 30 ~ 40 [°C] |
|---|---|---|---|---|
| # 1 | 3.0 [mA] | 2.8 [mA] | 2.5 [mA] | 2.4 [mA] |
| # 2 | 3.3 [mA] | 2.9 [mA] | 2.7 [mA] | 2.6 [mA] |
| # 3 | 2.9 [mA] | 2.8 [mA] | 2.6 [mA] | 2.5 [mA] |
| . | . | . | . | . |
| . | . | . | . | . |
| . | . | . | . | . |
| # 100 | 3.1 [mA] | 2.8 [mA] | 2.6 [mA] | 2.5 [mA] |
| Avg | 3.0 [mA] | 2.8 [mA] | 2.5 [mA] | 2.4 [mA] |
| Max | 3.4 [mA] | 3.0 [mA] | 2.8 [mA] | 2.8 [mA] |
| Min | 2.8 [mA] | 2.6 [mA] | 2.4 [mA] | 2.3 [mA] |

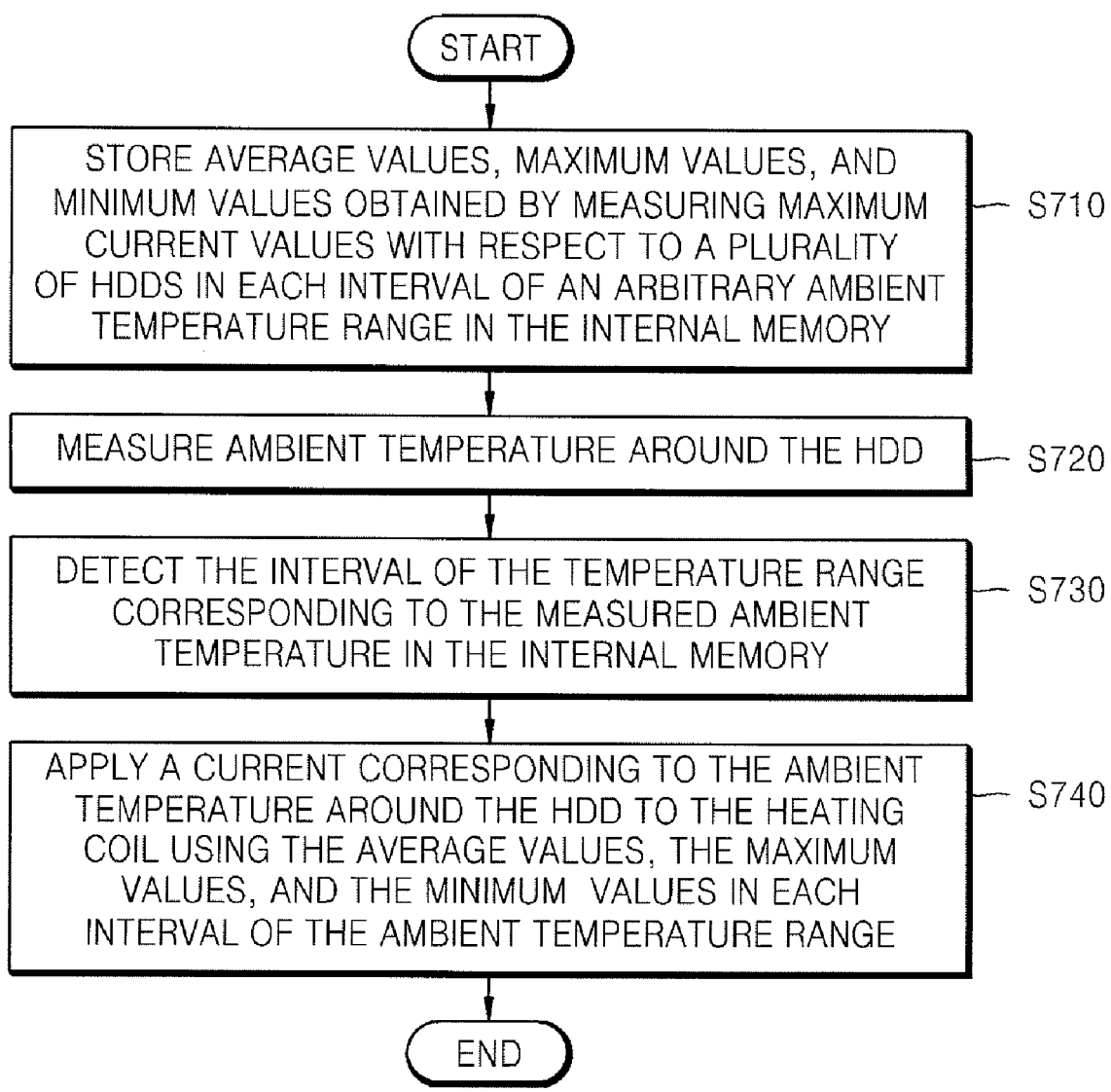

HARD DISK DRIVE HAVING IMPROVED HEAD STABILITY AT LOW TEMPERATURE AND METHOD OF APPLYING CURRENT TO A HEAD OF THE HARD DISK DRIVE

CROSS-REFERENCE TO RELATED APPLICATIONS

This application claims the benefit under 35 U.S.C. §119(a) of Korean Patent Application No. 10-2007-0032938, filed on Apr. 3, 2007, in the Korean Intellectual Property Office, the disclosure of which is incorporated herein in its entirety.

BACKGROUND OF THE INVENTION

1. Field of the Invention

The present general inventive concept relates to a hard disc drive (HDD), and more particularly, to a HDD having improved head stability at low temperatures, and a method of supplying current to a head of an HDD.

2. Description of the Related Art

Generally, hard disc drives (HDDs) are recording apparatuses used to store digitally encoded data. Typically, the data is recorded on concentric tracks that are formed on a surface of a magnetic recording disc. The magnetic recording disc is rotatably mounted on a spindle motor, and the data is recorded on the concentric tracks are accessed by a read/write head that is mounted on an actuator arm. The actuator arm is rotated by a voice coil motor and is actuated by a current supplied from the voice coil motor. With regard to the read operation of the read/write head, a current is supplied to the read/write head to record data on the magnetic disc. The supplied current generates a magnetic field, and the magnetic field magnetizes the surface of the magnetic recording disc. The read/write head reads the data that is recorded on the surface of the magnetic recording disc by detecting magnetic changes within the magnetic disc.

Various improvements have been made to HDD read/write heads, including separating out the read device (or read head) from the write device (or write head). The separate read device utilizes the magneto resistance (MR) effect, which changes the resistance of a material in the presence of a magnetic field. With the advent of increased storage capacity of HDDs, the conventional giant magneto resistance (GMR) read head was introduced. However, it has been discovered that the GMR head does not provide sufficient bit per inch (BPI) read sensitivity. Therefore, most of the present HDDs generally use a tunnel magneto resistance (TuMR) head as the read operation head. In contrast to the GMR head, the TuMR head has a high BPI read sensitivity, and is very stable and reliable at high temperatures. The enhanced BPI sensitivity, stability and reliability of the TuMR head during read operations can be attributed to the fact that the TuMR head draws less current, as compared to the GMR head, when a read operation is performed. However, the read operation of the TuMR head is unstable at low temperatures since the TuMR head is made of a thin film. Therefore, the instability of the TuMR head at low temperatures has been evaluated by using various test methods. One test method includes supplying a current to the TuMR head that is much greater than the current supplied in a normal read operation. In other words, the instability of the TuMR head at low temperatures is pre-tested by performing a read operation under severe conditions. An alternate method of testing the read operation at low temperatures includes placing a TuMR head directly in a low temperature chamber. However, with both scenarios catastrophic problems may arise. For example, due to the excessive current supplied to the TuMR head in the first test scenario or alternatively, due to the large current required to drive the HDD in the second test scenario, the TuMR head can be damaged. Therefore, there still exists a need to effectively address the instability of the TuMR head during a read operation at low temperatures.

SUMMARY OF THE INVENTION

The present general inventive concept provides a HDD with improved head stability at low temperatures by supplying an optimum current to a heating coil inserted in the TuMR head corresponding to the surrounding ambient temperature.

The present general inventive concept also provides a method of supplying a current to the TuMR head of the HDD.

Additional aspects and utilities of the present general inventive concept will be set forth in part in the description which follows and, in part, will be obvious from the description, or may be learned by practice of the general inventive concept.

The foregoing and/or other aspects of the present general inventive concept are achieved by providing a hard disc drive (HDD) including a disc, a tunneling magneto resistance (TuMR) head to read data that is recorded on the disc and having a heating coil, and a current control unit to supply a current to the heating coil corresponding to the ambient temperature surrounding the HDD.

The HDD can also include an internal memory to store average values which are obtained by calculating the average of the maximum current values measured with respect to a plurality of HDDs in each interval of an arbitrary ambient temperature range. The maximum current values of each of the plurality of HDDs are determined by evaluating the amount of current that can be supplied to the heating coil in each TuMR head without contacting the TuMR head with the disc in each interval of the arbitrary ambient temperature range.

The current control unit can supply a current to the heating coil corresponding to a measured ambient temperature using the average values in each interval of the ambient temperature range.

The internal memory can also store the maximum values and minimum values of the measured maximum current values of each of the plurality of HDDs in each interval of the ambient temperature range.

The current control unit can also supply a current to the heating coil corresponding to the ambient temperature using the average values, the maximum values, and the minimum values in each interval of the ambient temperature range.

The current control unit can also detect the interval of the ambient temperature range corresponding to the ambient temperature surrounding the HDD in the internal memory.

The HDD can also include an ambient temperature detection unit to detect ambient temperature surrounding the HDD to the internal memory.

The foregoing and/or other aspects of the present general inventive concept may also be achieved by providing a HDD including a disc, a tunneling magneto resistance (TuMR) head to read data recorded on the disc and having a heating coil, an internal memory to store the average values obtained by calculating the average of the maximum current values measured with respect to a plurality of HDDs in each interval of an arbitrary ambient temperature range, and a current control unit to supply a current to the heating coil corresponding to an ambient temperature surrounding the HDD, using the average values in each interval of the of the ambient temperature range. The maximum current values of each of the HDDs is determined by evaluating the maximum amount current that can be supplied to the heating coil without contacting the TuMR head with the disc in each interval of the arbitrary ambient temperature range.

The HDD can also include an ambient temperature detection unit to detect ambient temperature surrounding the HDD.

The foregoing and/or other aspects of the present general inventive concept may also be achieved by providing a method of supplying a current to a head of an HDD that performs a read operation and has a heating coil. The method includes storing average values that are obtained by averaging maximum current values measured with respect to a plurality of HDDs in each interval of an arbitrary ambient temperature range in an internal memory, measuring ambient temperature surrounding the HDD to be controlled, and supplying a current corresponding to the ambient temperature surrounding the HDD to the heating coil, using the average values in each interval of the ambient temperature range. The maximum current values of each of the plurality of HDDs is the amount of current that can be supplied to the heating coil without contacting the TuMR head with the disc in each interval of the arbitrary ambient temperature range.

The storing of the average values in the internal memory includes storing the maximum values and minimum values of the maximum current values of each of the HDDs in each interval of the ambient temperature range.

The supplying of a current corresponding to the ambient temperature to the heating coil includes supplying the current corresponding to the ambient temperature to the heating coil based on the average values, the maximum values, and the minimum values in each interval of the ambient temperature range.

The head can be a TuMR head.

The supplying of a current to the head of the HDD may also include detecting an interval of the ambient temperature range corresponding to the measured ambient temperature that is stored in the internal memory.

The foregoing and/or other aspects of the present general inventive concept may also be achieved by providing a TuMR head having a heating coil, an HDD including a disc, an internal memory to store predetermined maximum current values, and a current control unit to supply an optimum current value among the predetermined maximum current values to the heating coil of the TuMR head based on an ambient temperature.

The optimum current values can be determined by calculating average values with respect to a plurality of HDDs for each interval in a predetermined temperature range. The maximum current values are the maximum amount of current that can be supplied to each of the plurality of HDDs without the TuMR contacting the disc.

The HDD can also include an ambient temperature detection unit disposed within the HDD to measure the ambient temperature.

The internal memory can also store maximum values and minimum values of the maximum current values measured with respect to each of the plurality of HDDs in each interval of the predetermined temperature range.

The foregoing and/or other aspects of the present general inventive concept may also be achieved by providing a method of controlling a distance between a TuMR head and a disc of an HDD. The method includes storing predetermined maximum current values in a storage unit and supplying an optimum current value among the predetermined maximum current values to a heating coil of the TuMR head based on an ambient temperature.

The optimum current values can be determined by calculating average values with respect to a plurality of HDDs for each interval in a predetermined range. The maximum current values are the maximum amount of current that can be supplied to each of the plurality of HDDs without the TuMR head contacting the disc.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which are described below.

FIG. 7 is a flow chart diagram illustrating a method of supplying a current to the head of a HDD according to another embodiment of the present general inventive concept.

DETAILED DESCRIPTION OF THE PREFERRED EMBODIMENTS

Figure 1A:
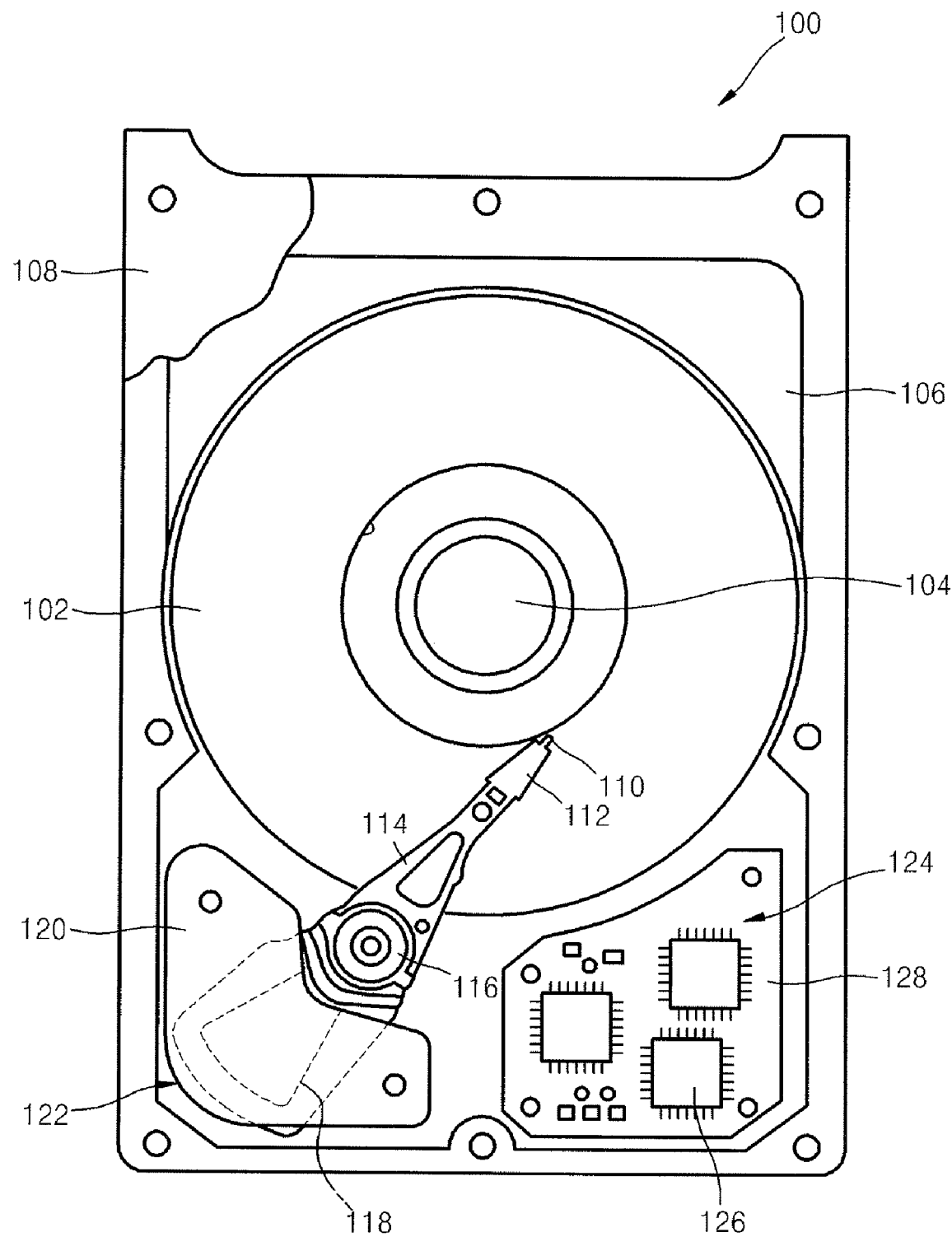
FIG. 1A is a plan view illustrating a hard disc drive (HDD) according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1A is a plan view illustrating a hard disc drive (HDD) 100 according to an embodiment of the present general inventive concept.

Referring to FIG. 1A, the HDD 100 can include at least one magnetic disc 102 rotated by a spindle motor 104 and mounted on a base plate 106 of the HDD 100. The HDD 100 can further include a cover 108 for the magnetic disc 102.

The HDD 100 can also include a plurality of heads 110. Each of the heads 110 is located adjacent to the magnetic disc 102 and can include separate write and read devices (not shown) to magnetize and detect magnetic fields of the magnetic discs 102, respectively.

Each of the heads 110 is mounted on a flexure 112 to form a head gimbal assembly (HGA), and thus, is maintained at a horizontal level. The flexure 112 is attached to an actuator arm 114, and the actuator arm 114 is rotatably mounted on the base plate 106 via a bearing assembly 116.

Each of the heads 110 have individual characteristics. For example, each of the heads 110 has its own bit per inch, tracks per inch, tracks per head, and number of sectors per track. Thus, the data transfer rate of each of the heads 110 can be different. The characteristics of each of the heads 110 can be recorded on a system cylinder of the magnetic disc 102.

A voice coil 118 is connected to a magnetic assembly 120 to form a voice coil motor (VCM) 122. When a current is supplied to the voice coil 118, a torque to rotate the actuator arm 114 is generated, and thus, the heads 110 move across the surface of the magnetic discs 102.

The HDD 100 can further include a printed circuit board assembly 124. The printed circuit board assembly 124 can include a plurality of integrated circuits 126 connected to a printed circuit board 128. The printed circuit board 128 is connected to the voice coil 118, the heads 110, and the spindle motor 104 via wires (not shown).

Figure 1B:
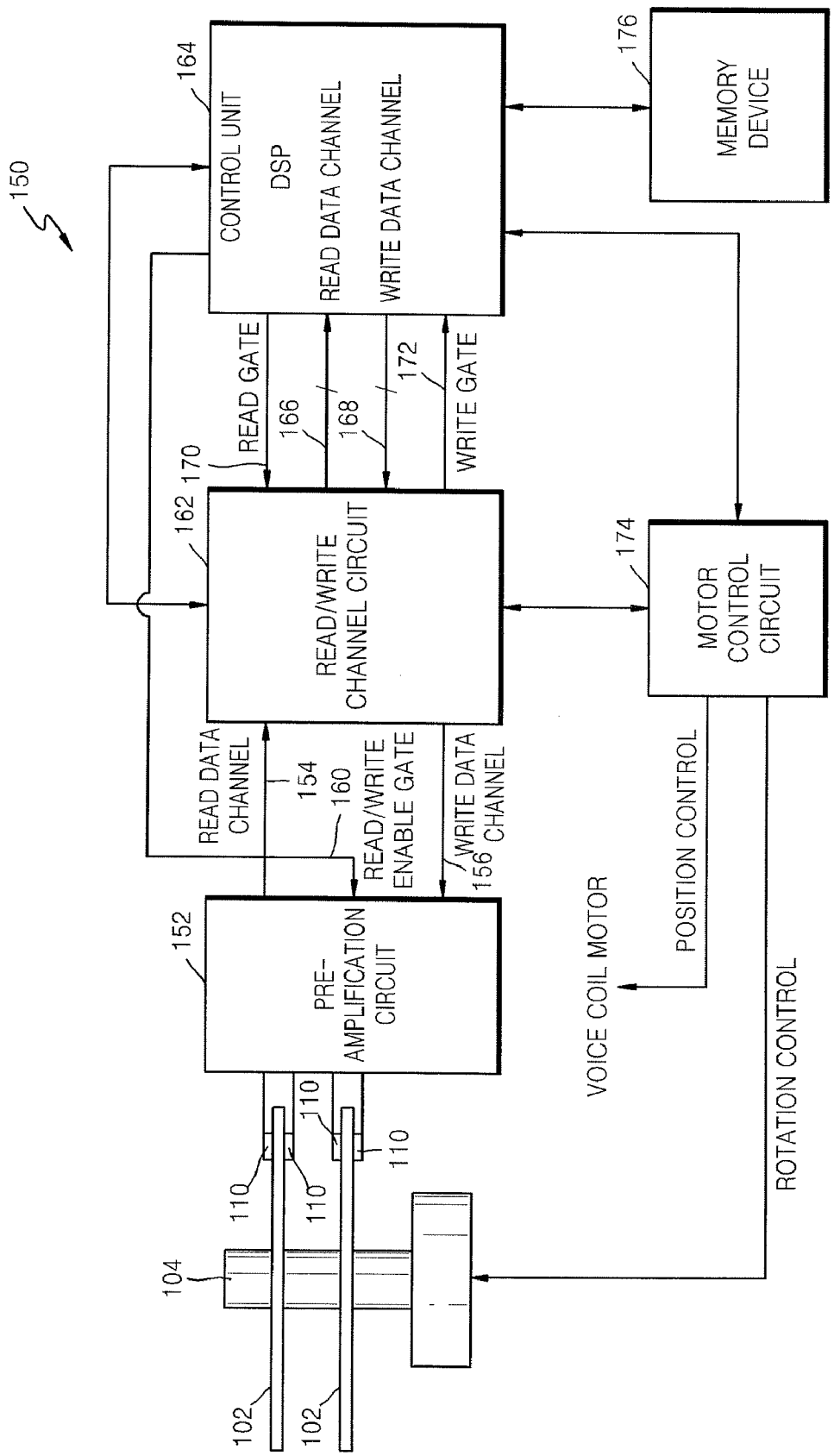
FIG. 1B is a schematic electrical circuit illustrating the embodiment of FIG. 1A according the present general inventive concept.

FIG. 1B is a schematic electrical circuit 150 of the HDD 100 of FIG. 1A, according to an embodiment of the general inventive concept. Referring to FIG. 1B, the electrical circuit 150 can include a pre-amplification circuit 152 connected to the heads 110. The pre-amplification circuit 152 includes a read data channel 154 and a write data channel 156 connected to a read/write channel circuit 162.

The pre-amplification circuit 152 also includes a read/write enable gate 160 connected to a control unit 164. Data can be recorded on the magnetic discs 102 or read from the magnetic discs 102 by enabling the read/write enable gate 160.

The read/write channel circuit 162 is connected to the control unit 164 through read and write channels 166 and 168, respectively, and through read and write gates 170 and 172, respectively. The read gate 170 is enabled when the data is read from the magnetic disc 102. The write gate 172 is enabled when data is recorded on the magnetic disc 102.

The control unit 164 can be a digital signal processor that operates according to a software routine. The software routine includes a routine to write data on the magnetic disc 102 and read data from the magnetic disc 102.

The read/write channel circuit 162 and the control unit 164 can be connected to a motor control circuit 174 that controls the voice coil motor (VCM) 122 of the HDD 100 and the spindle motor 104.

The control unit 164 can be connected to a non-volatile memory device 176. For example, the non-volatile memory device 176 can be a read only memory (ROM). The non-volatile memory device 176 can store commands to operate the control unit 164 and the HDD 100. Alternatively, the control unit 164 can include firmware to operate the HDD 100.

Figure 2:
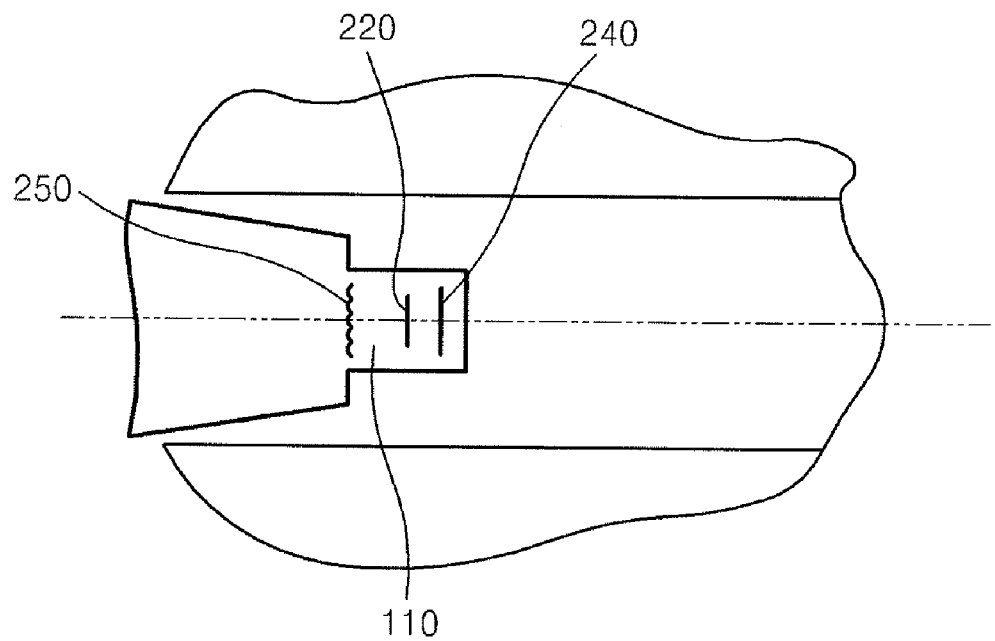
FIG. 2 is a plan view illustrating an enlarged head of the embodiment as illustrated in FIG. 1A according to the present general inventive concept.

FIG. 2 is an enlarged view of a head 110 of the HDD 100 illustrated in FIG. 1A according to an embodiment of the present general inventive concept.

Referring to FIG. 2, the head 110 can include a write device 240 and a read device 220 that are separate from each other. The write device 240 magnetizes the magnetic disc 102 in order to write data to the disc. The read device 220 detects a magnetic field of the magnetic disc 102 in order to read data from the disc. As an example, the read device 220 can be formed of a magneto resistive (MR) material having a resistance that varies linearly according to a magnetic flux. The head 110 also includes a heating coil 250. In order to generate heat in the head 110, a current can be supplied to the heating coil 250. The head 110 thermally expands due to the heat generated from the heating coil 250. The thermal expansion of the head 110 causes the read device 220 and the write device 240 to move closer to the magnetic disc 102. The technique described above, called the flying height on demand (FOD) technique, which essentially controls the flying height (FH) of the head 110 using the heating coil 250. The movement of the head 110 using the FOD technique will be described in further detail with reference to FIG. 3.

Figure 3:
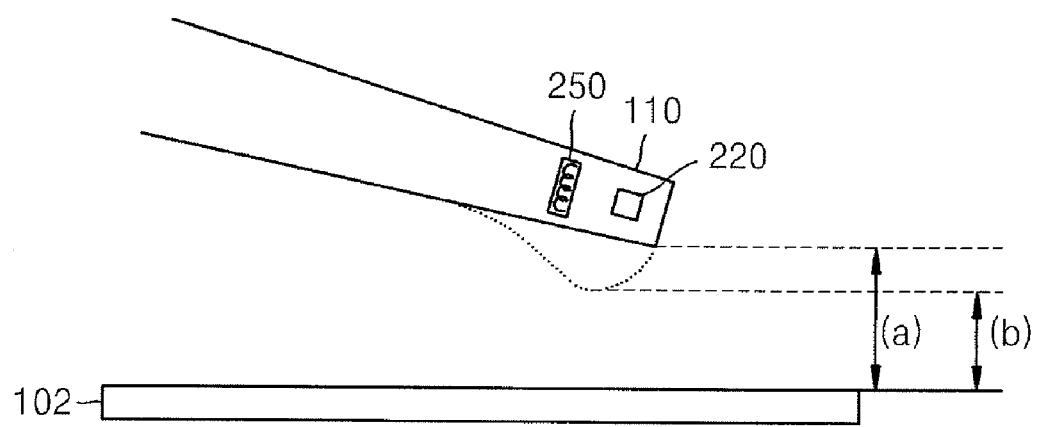
FIG. 3 is a schematic drawing illustrating the head variations as a current is supplied to the head illustrated in FIG. 2.

FIG. 3 is a schematic drawing illustrating head variations as a current is supplied to the head 110 illustrated in FIG. 2.

Referring to FIG. 3, as described above, the FH of the head 110 varies according to the amount of current that is supplied to the head 110. For example, when current is not supplied to heating coil 250, the head 110 is at a height (a) since the head 110 has not expanded. However, when current is supplied to the head 110, the head 110 expands. As a result, the FH of the head 110 is reduced from height (a) to height (b). Thus, it can be seen that the FOD technique is used to control the FH of the head 110 by controlling the current supplied to the heating coil 250. According to the amount of current supplied to the head 110, the FH of the head 110 varies, and thus, the read device 220 of the head 110 moves either closer to or farther away from the magnetic disc 102.

Figures 4, 5:
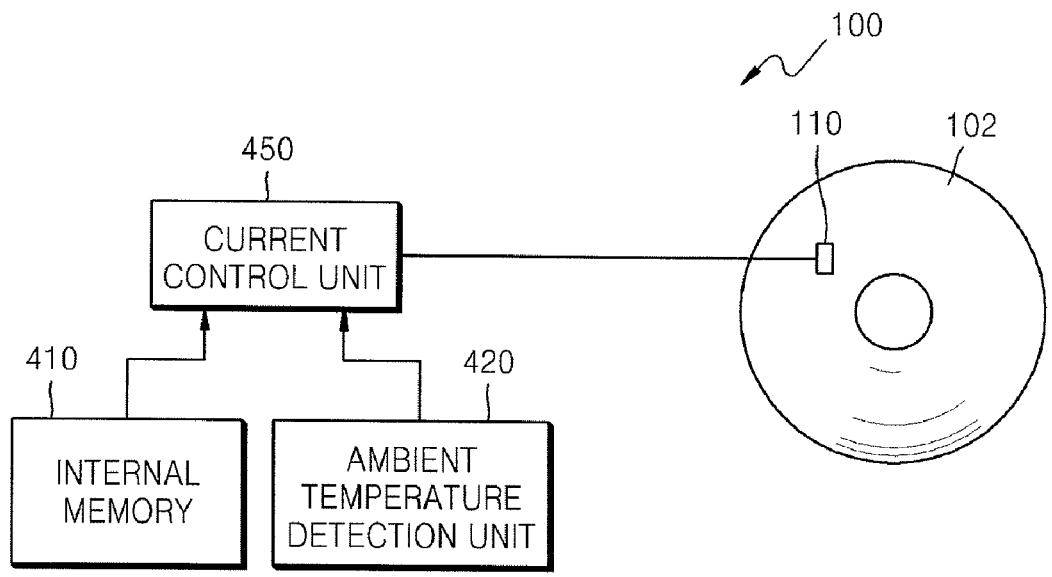
FIG. 4 is a block diagram illustrating an HDD according to another embodiment of the present general inventive concept.
FIG. 5 is a table illustrating data stored in the internal memory illustrated in FIG. 4 according to the present general inventive concept.

FIG. 4 is a block diagram illustrating an operation of the HDD 100 according to another embodiment of the present general inventive concept.

Referring to FIG. 4, the HDD 100 includes the disc 102, the head 110, an internal memory 410, an ambient temperature detection unit 420, and a current control unit 450.

The head 110 either writes data on the disc 102 or reads data from the disc 102. In one embodiment of the present general inventive concept, the head 110 can be a tunnel magneto resistance (TuMR) head. Therefore, since the read operation of the TuMR head 100 at low temperatures is very unstable, the present general inventive concept can effectively solve, among other things, the instability problem of the TuMR head 100 at low temperatures.

The internal memory 410 can store an average value of measured maximum current values of each of the HDDs 100 in each interval of an arbitrary ambient temperature range. Also, the internal memory 410 can further store the maximum value and minimum value of the measured maximum current values of each of the HDDs 100 in each interval of the arbitrary ambient temperature range. The maximum current value of each of the HDDs 100 is defined as the maximum amount of current that can be supplied to the heating coil 250 without causing a contact between the head 110 and the disc 102 in each interval of the arbitrary ambient temperature range. The above-mentioned values stored in the internal memory 410 will be described further with reference to FIG. 5.

FIG. 5 is a table illustrating data stored in the internal memory 410 of FIG. 4. For example, it is assumed in the present embodiment that the average values, the maximum values, and the minimum values are obtained by taking 100 HDD samples and evaluating them at 10° C. intervals between an arbitrary ambient temperature range of 0 and 40° C. In the case of a first HDD #1 at the interval of the arbitrary ambient temperature range of 0 to 10° C., when a current of 3 mA is supplied to the head, the head and the disc 102 do not contact each other. Thus, 3 mA is the maximum current value of the first HDD #1 at the temperature range of 0 to 10° C. Also, in the case of the first HDD #1 at the interval of the arbitrary ambient temperature range of 10 to 20° C., when a current of 2.8 mA is supplied to the head, the head and the disc do not contact each other. Thus, 2.8 mA is the maximum current value of the HDD #1 at the temperature rage of 10 to 20° C. In the same manner as above, maximum current values that can be supplied to the head of the HDD #1 without contacting the head and the disc, at the intervals of 20 to 30° C. and 30 to 40° C. are 2.5 mA and 2.4 mA, respectively. Accordingly, the maximum current values at each interval of the arbitrary ambient temperature range are determined for each of the HDDs#2-#100 using the same manner as described above. Once the maximum current values at each interval of the arbitrary ambient temperature range for HDDs

1-#100 are all determined, the average values, maximum values, and minimum values at each interval of the arbitrary ambient temperature range are also determined. In the case of the interval of the ambient temperature range of 0 to 10° C., the average value Avg, obtained by calculating the average of the maximum current values of each of the HDDs #1-#100 in the interval of 0 to 10° C. is 3.0 mA. Also, in the same interval of the arbitrary ambient temperature range, the maximum value Max and the minimum value Min (of the maximum current values of each of the HDDs #1-#100), are 3.4 mA and 2.8 mA, respectively. In the same manner as above, the average values Avg, the maximum values Max, and the minimum values Min of the intervals of the arbitrary ambient temperature range of 20 to 30° C., 30 to 40° C., and 40 to 50° C. are all obtained. The internal memory 410 can store the above-referenced average values Avg, the maximum values Max, and the minimum values Min for each interval of the arbitrary ambient temperature range.

Once the average values Avg, maximum values Max, and minimum values Min are obtained and stored in the internal memory, the ambient temperature detection unit 420 detects the ambient temperature surrounding the HDD. The current control unit 450 then supplies a current corresponding to the above-measured ambient temperature, detected by the ambient temperature detection unit 420, to the heating coil 250 of the head 110. In order to supply an optimum current, the current control unit detects an interval in arbitrary temperature range, stored in the internal memory that corresponds to the measured ambient temperature. Thus, the current control unit 450 can use the average value Avg, the maximum value Max, and the minimum value Min of the interval in the arbitrary temperature range, stored in the internal memory 410, that corresponds best to the measured ambient temperature when supplying a current to the heating coil 250. For example, if the average value Avg, the maximum value Max, and the minimum value Min for some interval in the arbitrary temperature range are all stored in the internal memory 410, the current control unit 450 first detects the interval of the arbitrary ambient temperature range stored in the internal memory that best corresponds to the above-measured ambient temperature 410. The current control unit 450 then supplies an optimum current to the heating coil 250 of the head 110 using the average value Avg, the maximum value Max, and the minimum value Min of the interval of the arbitrary ambient temperature stored in the internal memory 410, which corresponds best to the measured ambient temperature. A method of applying an optimum current to the heating coil 250 of the head 110 will now be described with reference to FIG. 6.

Figure 6:
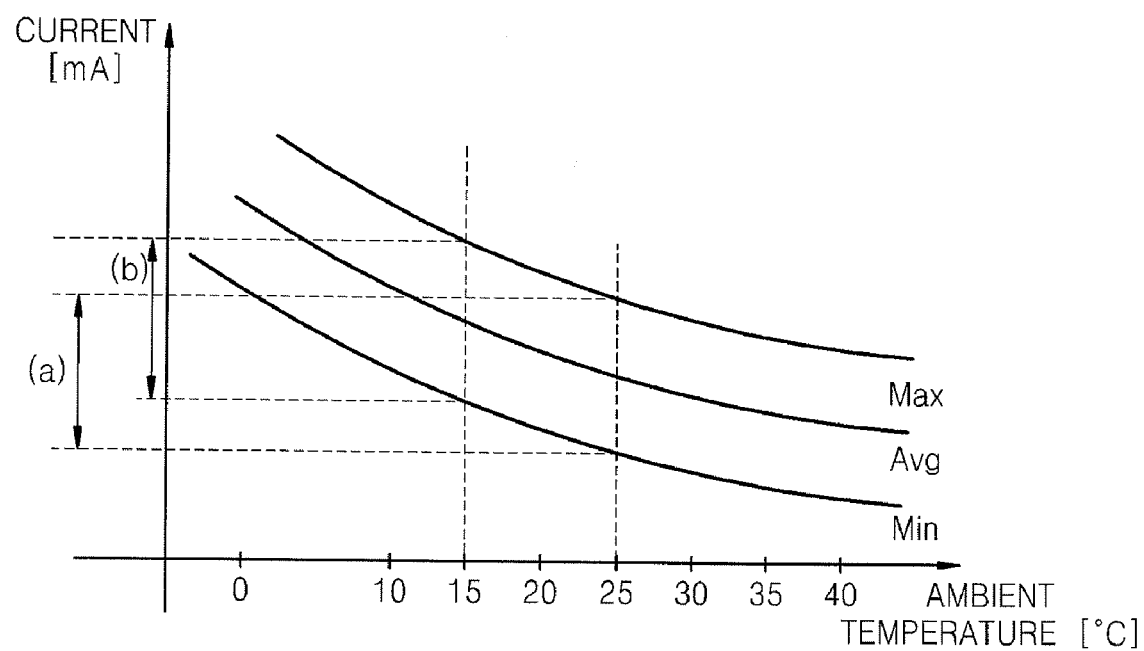
FIG. 6 is a graph illustrating values stored in the internal memory illustrated in FIG. 4, according to the present general inventive concept.

FIG. 6 is a graph illustrating values stored in the internal memory 410 illustrated in FIG. 4.

FIG. 6 is a graph illustrating the average values Avg, the maximum values Max, and the minimum values Min that are stored in the internal memory 410. Referring to FIGS. 4 through 6, if the ambient temperature detected by the ambient temperature detection unit 420 is 25° C., the average value Avg, the maximum value Max, and the minimum value Min at the ambient temperature of 25° C. are determined. In this case, the current control unit 450 supplies a current of an interval (a) to the heating coil 250 of the head 110. That is, the current control unit 450 supplies a current between the minimum value Min and the maximum value Max to the heating coil 250 at a temperature of 25° C. If the ambient temperature detection unit 420 detects an ambient temperature of 15° C., the current control unit 450 then supplies a current of an interval (b) to the heating coil 250 of the head 110. Accordingly, in the case of a low ambient temperature, an optimum current can be supplied to the heating coil 250 using the FOD technique, and thus, a stable operation of the head 110 can be achieved.

FIG. 7 is a flow chart illustrating a method of supplying a current to the head 110 of the HDD 100 according to another embodiment of the present invention general inventive concept.

Referring to FIGS. 4 through 7, an internal memory 410 stores average values Avg, maximum values Max, and minimum values Min. The minimum values Min are obtained from the maximum current values measured with respect to the plurality of HDDs in each interval of an arbitrary ambient temperature range (operation S710). An ambient temperature detection unit 420 measures ambient temperature surrounding the HDD 100 (operation S720). A current control unit 450 detects the interval of the arbitrary ambient temperature range corresponding to the measured ambient temperature stored in the internal memory 410 (operation S730). After the interval of the arbitrary ambient temperature range corresponding to the measured ambient temperature is detected by the detecting operation of the current control unit 450, the current control unit 450 then supplies a current corresponding best to the measured ambient temperature to the heating coil 250 of the head 110 using the average value Avg, the maximum value Max, and the minimum value Min of the corresponding interval of the arbitrary temperature range (operation S740).

As described above with the HDD and the method of supplying a current to the HDD according to the present embodiments of the general inventive concept, upon inserting a heating coil in a TuMR head, an optimum current according to the surrounding ambient temperature can be supplied to the heating coil of the TuMR head. Thus, the TuMR head instability during a reading operation at low temperatures can be prevented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A hard disc drive (HDD) comprising:
    a disc;
    a tunneling magneto resistance (TuMR) head to read data recorded on the disc having a heating coil;
    an ambient temperature detection unit to detect an ambient temperature surrounding the HDD;
    a current control unit to supply a current corresponding to a detected ambient temperature surrounding the HDD to the heating coil; and
    an internal memory to store average values obtained by averaging maximum current values measured in predetermined intervals of an arbitrary ambient temperature range,
    wherein the maximum current value is a maximum amount of current supplied to the heating coil without contacting the TuMR head with the disc in each predetermined interval of the arbitrary ambient temperature range.

2. The HDD of claim 1, wherein the current control unit supplies a current corresponding to a measured ambient temperature to the heating coil using the average values in each interval of the ambient temperature range.

3. The HDD of claim 1, wherein the internal memory further stores the maximum values and minimum values of the measured maximum current values of each of the plurality of HDDs in each interval of the ambient temperature range.

4. The HDD of claim 3, wherein the current control unit supplies a current corresponding to the measured ambient temperature to the heating coil using the average values, the maximum values and the minimum values in each interval of the ambient temperature range.

5. The HDD of claim 1, wherein the current control unit detects the interval of the ambient temperature range corresponding to the ambient temperature surrounding the HDD in the internal memory.

6. The HDD of claim 1, wherein the intervals of the ambient temperature range have a temperature interval of 10° C.

7. An HDD comprising:
a disc;
a tunneling magneto resistance (TuMR) head to read data recorded on the disc having a heating coil;
an internal memory to store average values obtained by averaging maximum current values measured with respect to a plurality of HDDs in each interval of an arbitrary ambient temperature range; and
a current control unit to supply a current corresponding to an ambient temperature surrounding the HDD to the heating coil using the average values in each interval of the arbitrary ambient temperature range,
wherein the maximum current values of each of the plurality of HDDs is the amount of current that can be applied to the heating coil without contacting the TuMR head with the disc in each interval of the arbitrary ambient temperature range.

8. The HDD of claim 7, wherein the internal memory further stores the maximum values and minimum values of the measured maximum current values of each of the plurality of HDDs in each interval of the ambient temperature range.

9. The HDD of claim 8, wherein the current control unit supplies a current corresponding to the ambient temperature to the heating coil using the average values, the maximum values and the minimum values in each interval of the ambient temperature range.

10. The HDD of claim 7, wherein the current control unit detects the interval of the ambient temperature range corresponding to the ambient temperature surrounding the HDD stored in the internal memory.

11. The HDD of claim 7, further comprising an ambient temperature detection unit for detecting ambient temperature surrounding the HDD.

12. A method of applying a current to a head that performs a reading operation and has a heating coil, the method comprising:
storing average values obtained by averaging maximum current values measured with respect to a plurality of HDDs in each interval of an arbitrary ambient temperature range in an internal memory;
measuring an ambient temperature surrounding the HDD to be controlled; and
supplying a current corresponding to the ambient temperature surrounding the HDD to the heating coil using the average values in each interval of the ambient temperature range,
wherein the maximum current values of each of the plurality of HDDs is the amount of current that can be supplied to the heating coil without contacting the TuMR head with the disc in each interval of the arbitrary ambient temperature range.

13. The method of claim 12, wherein the storing of the average values in the internal memory further comprises:
storing maximum values and minimum values of the maximum current values measured for each of the plurality of HDDs in each interval of the ambient temperature range.

14. The method of claim 13, wherein in the supplying of a current corresponding to the ambient temperature to the heating coil, the current corresponding to the ambient temperature to the heating coil is applied based on the average values, the maximum values, and the minimum values in each interval of the ambient temperature range.

15. The method of claim 12, wherein the head is a TuMR (tunnel magneto resistance).

16. The method of claim 12, wherein the supplying of a current to the head of the HDD further comprises:
detecting an interval of the ambient temperature range corresponding to the measured ambient temperature stored in the internal memory.

17. A HDD comprising:
a disc;
a TuMR head having a heating coil thereon;
an internal memory to store predetermined maximum current values; and
a current control unit to supply an optimum current value among the predetermined maximum current values to the heating coil of the TuMR head based on an ambient temperature,
wherein the optimum current value is determined by calculating average values with respect to a plurality of HDDs for each interval in a predetermined temperature range, and
wherein the stored predetermined maximum current values are a maximum amount of current that can be supplied to each of the pluality of the HDDs without the TuMR contacting the disc.

18. The HDD of claim 17, further comprising:
an ambient temperature detection unit disposed within the HDD to measure the ambient temperature.

19. The HDD of claim 18, wherein the internal memory also stores maximum values and minimum values of maximum current values measured with respect to each of the plurality of HDDs in each interval of the predetermined temperature range.

20. A method of controlling a distance between a TuMR head and a disc on an HDD, the method comprising:
storing predetermined maximum current values in a storage unit; and
supplying an optimum current value to a heating coil of the TuMR by selecting the optimum current from among the predetermined maximum current values based on an ambient temperature,
wherein the supplied optimum current value is selected from the predetermined maximum current values that are determined by calculating average values with respect to a plurality of HDDs for each interval in a predetermined range, and
wherein the maximum current values are the maximum amount of current that can be supplied to each of the plurality of HDDs without the TuMR head contacting the disc.

* * * * *